UNITED STATES PATENT OFFICE.

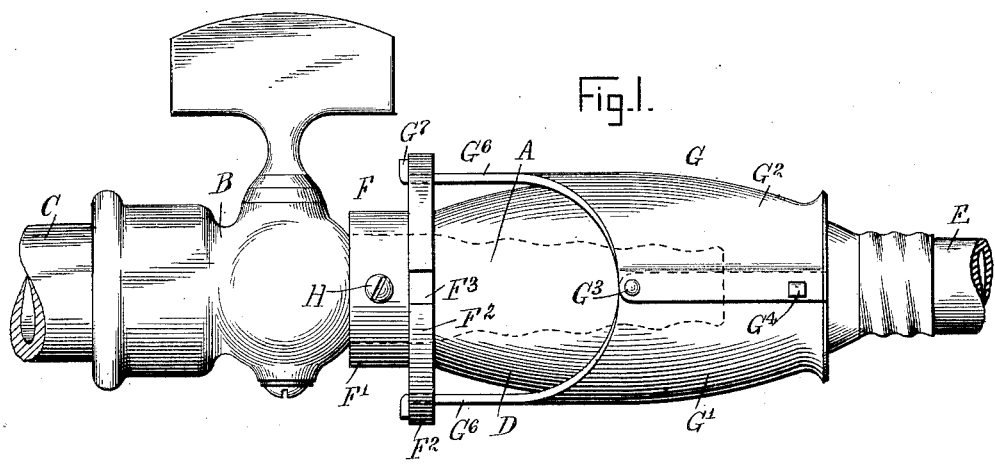
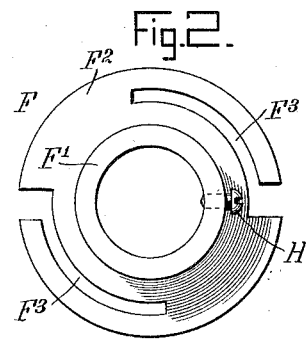
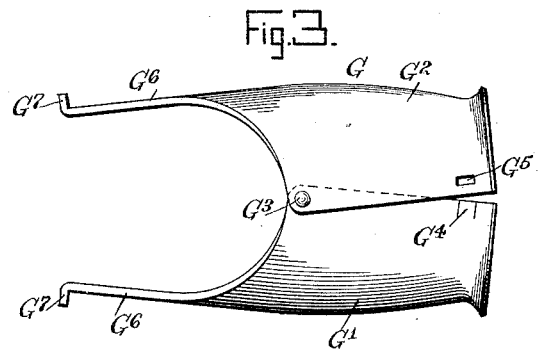
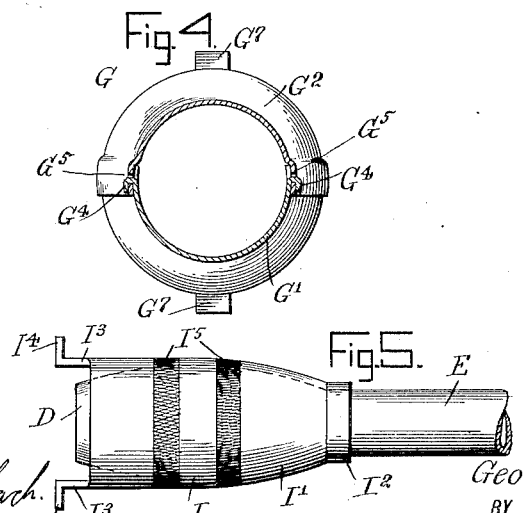

GEORGE K. HOFF, OF PHILADELPHIA, PENNSYLVANIA.

GAS-TUBE COUPLING.

1,097,436.

Specification of Letters Patent.

Patented May 19, 1914.

Application filed July 2, 1913. Serial No. 777,051.

*To all whom it may concern:*

Be it known that I, GEORGE K. HOFF, a a citizen of the United States, and a resident of Homesburg, Philadelphia, in the county of Philadephia and State of Pennsylvania, have invented a new and Improved Gas-Tube Coupler, of which the following is a full, clear, and exact description.

The invention relates to flexible gas tubes, such as are used for conducting gas from a gas bracket or service pipe to a gas lamp, gas stove or the like.

The object of the invention is to provide a new and improved gas tube coupler arranged for convenient attachment to the gas nipple and without danger of becoming accidentally detached. In order to accomplish the desired result use is made of a retaining coupling member adapted to be secured to the gas nipple and a connecting coupling member held on the bulb of the gas tube and detachably engaging the said retaining coupling member.

A practical embodiment of the invention is represented in the accompanying drawings forming a part of this specification, in which similar characters of reference indicate corresponding parts in all the views.

Figure 1 is a side elevation of the coupler as applied; Fig. 2 is a face view of the retaining member of the coupler; Fig. 3 is a like view of the connecting coupling member in open position; Fig. 4 is a cross section of the same in closed position; and Fig. 5 is a side elevation of a modified form of the coupler.

The nipple A on the valve B of a gas supply pipe C or a gas lamp, gas stove or other similar device is adapted to be engaged by a rubber bulb D of the usual ovoidal shape and attached to the end of a flexible gas tube or hose E. In order to securely lock the bulb D in position on the nipple A use is made of a coupler formed of two members F and G, of which the member F is the retaining coupling member and is secured by a set screw H or other fastening device to the back end of the nipple A, while the member G is the connecting coupling member and is attached to the back of the bulb D to prevent it from slipping off the bulb in an outward direction.

The retaining coupling member F consists of a hub F' and a disk F² provided with bayonet slots F³, the hub F' carrying the set screw H for fastening the retaining coupling member in position on the nipple A, as previously explained. The connecting coupling member G is formed of two gripping parts G', G² of semi-ovoidal shape and adapted to engage the rear half portion of the bulb D. The parts G' and G² are pivotally connected with each other at their forward ends by pivots G³ to allow of swinging the said parts G' and G² into open position, as shown in Fig. 3, whenever it is desired to place the connecting coupling member G in position on the rear portion of the bulb D. The rear end of the part G' is provided with struck-up lugs G⁴ adapted to pass through apertures G⁵ formed in the rear end of the other part G², so that after the connecting coupling member G is placed in position on the bulb D the parts G', G² are closed to snugly fit onto the rear half portion of the bulb D, and then the lugs G⁴ are passed through the apertures G⁵ and bent over, as shown in Figs. 1 and 4 so as to securely lock the parts G' and G² together while clampingly engaging the rear half portion of the bulb D. The parts G' and G² of the connecting coupling member G are provided with forwardly-extending arms G⁶ adapted to engage the bayonet slots F³, and the said arms G⁶ terminate in angular lugs G⁷ adapted to abut against the rear face of the disk F² so as to securely hold the connecting coupling member G in position on the retaining member F.

It is understood that the arms G⁶ are engaged with the open ends of the bayonet slots F³, after which a quarter turn is given to the connecting coupling member G with a view to move the arms G⁶ to the inner ends of the bayonet slots F³. When the parts are in this position the coupling member G is securely attached to the coupling member F to prevent the bulb D from becoming accidentally detached from the nipple A. It is also understood that when the parts G', G² are in closed position on the rear half of the bulb D then the connecting coupling member G cannot slide forwardly off the bulb D and consequently the bulb D is held locked in place on the nipple A whenever the coupling member G is engaged with the retaining coupling member F.

In the modified form shown in Fig. 5 the connecting coupling member I is made of tubular shape having its rear end I' contracted to fit the rear portion of the bulb D, the rear end of the connecting coupling member I terminating in a band I² slidingly engaging the flexible gas tube or hose E. The forward end of the connecting coupling member I is provided with arms I³ for engagement with the bayonet slots F³ and the said arms terminate in angular lugs I⁴ adapted to abut against the rear face of the disk F², the same as previously explained relative to the lugs G⁷. In order to place the connecting coupling member I in position it is necessary to slip the said coupling member I onto the flexible gas tube or hose E prior to fastening the bulb D in position on the said pipe or hose E, and after the bulb D is secured to the tube or hose E then the connecting coupling member I is slipped forward until its contracted rear portion I' presses against the rear portion of the bulb D. The bulb can now be readily slipped onto the nipple and the arms I³ can be engaged with the bayonet slots F³, after which a quarter turn is given to the connecting coupling member I to move the arms I³ to the inner ends of the bayonet slots F³. In order to allow convenient turning of the coupling member I the latter is preferably provided with roughened exterior bands I⁵, as plainly indicated in Fig. 5.

The gas tube coupler shown and described is very simple in construction and can be readily applied to prevent the flexible gas tube or hose from becoming accidentally detached from the nipple A.

Having thus described my invention, I claim as new and desire to secure by Letters Patent:

1. A coupler for connecting the rubber bulb at the end of a flexible gas tube with a gas nipple, comprising a retaining coupling member fastened to the gas nipple and provided with bayonet slots, and a connecting coupling member made in parts the sides of which are pivotally connected with each other at their forward ends, the said parts having rear relatively movable gripping portions encircling the back end of the bulb and provided with relatively engaging members to secure them in closed position, and arms extending from the said pivoted portions and adapted to engage the said bayonet slots, the said arms terminating in angular lugs adapted to abut against the back of the retaining member.

2. A coupler for connecting the rubber bulb at the end of a flexible gas tube with a gas nipple, comprising a retaining coupling member fastened to the gas nipple and provided with bayonet slots, and a connecting coupling member made in parts pivotally connected with each other at one end, the said parts having gripping portions at their opposite end encircling the back end of the bulb, one of the said gripping portions having an aperture and the other having a struck-up tongue adapted to pass through the said aperture and bent over to lock the gripping portions when in closed position, and arms extending from the first mentioned ends of the said connecting member parts and adapted to engage the said bayonet slots, the said arms terminating in angular lugs adapted to abut against the back of the retaining coupling member.

3. A coupler for connecting the rubber bulb at the end of a flexible gas tube with a gas nipple, comprising a retaining coupling member fastened to the gas nipple, and a connecting coupling member made in parts pivotally connected with each other at one end, said two coupling members having relatively engaging means for detachably connecting them together, and the said parts of the connecting coupling member having gripping portions at their opposite end encircling the back end of the bulb, one of said gripping portions having an aperture and the other having a struck up tongue adapted to pass through the said aperture and bent over to lock the gripping portions in closed position, all for the purpose described.

In testimony whereof I have signed my name to this specification in the presence of two subscribing witnesses.

GEORGE K. HOFF.

Witnesses:
S. W. FOULKROD,
W. L. KILPATRICK.

---

Copies of this patent may be obtained for five cents each, by addressing the "Commissioner of Patents, Washington, D. C."